(12) United States Patent
Rosenberger (10) Patent No.: US 10,826,150 B2
(45) Date of Patent: Nov. 3, 2020

(54) CONNECTOR FOR CONNECTING AN OPTICAL FIBER AND AN ELECTRICAL CONDUCTOR

(71) Applicant: Rosenberger Hochfrequenztechnik GmbH & Co. KG, Fridolfing (DE)

(72) Inventor: Bernd Rosenberger, Tittmoning (DE)

(73) Assignee: ROSENBERGER HOCHFREQUENZTECHNIK GMBH & CO. KG, Fridolfing (DE)

( * ) Notice: Subject to any disclaimer, the term of this patent is extended or adjusted under 35 U.S.C. 154(b) by 0 days.

(21) Appl. No.: 16/332,039

(22) PCT Filed: Jul. 18, 2017

(86) PCT No.: PCT/EP2017/068104
§ 371 (c)(1),
(2) Date: Mar. 11, 2019

(87) PCT Pub. No.: WO2018/050322
PCT Pub. Date: Mar. 22, 2018

(65) Prior Publication Data
US 2019/0214757 A1 Jul. 11, 2019

(30) Foreign Application Priority Data

Sep. 16, 2016 (EP) .................... 16189158

(51) Int. Cl.
*H01P 5/02* (2006.01)
*H01P 5/08* (2006.01)
*H01R 13/658* (2011.01)

(52) U.S. Cl.
CPC .............. *H01P 5/026* (2013.01); *H01P 5/085* (2013.01); *H01R 13/658* (2013.01)

(58) Field of Classification Search
CPC .. G02B 6/4274; G02B 6/4284; H01R 12/712; H01R 12/714; H01R 12/716;
(Continued)

(56) References Cited

U.S. PATENT DOCUMENTS 4,776,087 A * 10/1988 Cronin ................ H01L 23/5384
257/E23.174
6,777,622 B2 * 8/2004 Ueno ................... H01B 7/0861
174/262
(Continued)

FOREIGN PATENT DOCUMENTS

CN       1460309 A     12/2003
CN     201008050 Y      1/2008
(Continued)

OTHER PUBLICATIONS

Sean S. Cahill et al, "Development of 100+ Ghz High-Frequency MicroCoax Wire Bonds", 39th International Symposium on Microelectronics (IMAPS 2006), Oct. 11, 2006, pp. 1-8, XP055348580, URL: http://processsolutionsconsulting.com/pdf/Reliability/Cahill_IMAPS2006_paper.pdf.
(Continued)

*Primary Examiner* — Robert Tavlykaev
(74) *Attorney, Agent, or Firm* — David P. Dickerson (57) ABSTRACT

The present invention relates to a connector (1), in particular for connecting an optical fiber (3) and an electrical conductor, comprising a printed circuit board (5); at least one electrical contact (7) which in each case has at least one internal conductor contact (11) and one external conductor contact (9); at least one electrical conductor (13) which has at least one internal conductor (15), one external conductor (17) and also one dielectric (19); wherein the electrical conductor (13) is connected, at a first end (21), to the electrical contact (7), and wherein the electrical conductor (13) is connected, at a second end (23), to an electrical
(Continued)

component (25) which is arranged on the printed circuit board (5).

14 Claims, 4 Drawing Sheets

(58) Field of Classification Search
CPC ......... H01R 12/724; H01P 5/026; H01P 5/08; H01P 5/082; H01P 5/085; H01P 5/087; H01P 5/103
USPC .............................................. 385/88, 89, 92
See application file for complete search history.

(56) References Cited

U.S. PATENT DOCUMENTS

| | | | | |
|---|---|---|---|---|
| 6,927,655 | B2* | 8/2005 | Torigoe | G02B 6/4201 333/260 |
| 7,140,918 | B1 | 11/2006 | Delaney et al. | |
| 7,348,597 | B1* | 3/2008 | Degerstrom | G01R 1/045 257/48 |
| 7,412,120 | B2* | 8/2008 | Yamamoto | G02B 6/42 385/14 |
| 7,892,028 | B2* | 2/2011 | Wu | H01R 4/04 439/607.28 |
| 8,344,257 | B2* | 1/2013 | Wu | H05K 1/0221 174/250 |
| 2003/0218257 | A1* | 11/2003 | Ishio | H01L 24/97 257/781 |
| 2004/0014341 | A1 | 1/2004 | Katou et al. | |
| 2004/0085150 | A1* | 5/2004 | Dove | H01P 1/268 333/22 R |
| 2005/0098348 | A1* | 5/2005 | Okumichi | H01L 23/552 174/262 |
| 2007/0098333 | A1* | 5/2007 | Gossen | G02B 6/4214 385/89 |
| 2008/0101752 | A1* | 5/2008 | Chan | G02B 6/4214 385/89 |
| 2009/0294155 | A1* | 12/2009 | Suzuki | H05K 1/0218 174/254 |
| 2012/0252266 | A1* | 10/2012 | Ling | H01R 9/038 439/581 |
| 2013/0288615 | A1* | 10/2013 | Anand | H01Q 1/241 455/77 |
| 2015/0222795 | A1* | 8/2015 | Sauer | H04N 5/2257 348/148 |
| 2016/0218455 | A1 | 7/2016 | Sayre et al. | |
| 2017/0162987 | A1* | 6/2017 | Kasturi | H01R 24/50 |

FOREIGN PATENT DOCUMENTS

| | | |
|---|---|---|
| CN | 102882022 A | 1/2013 |
| EP | 1376751 A1 | 1/2004 |
| EP | 2157667 A1 | 2/2010 |
| JP | 2000357755 A | 12/2000 |
| WO | 2015000591 A2 | 1/2015 |
| WO | 2015000594 A1 | 1/2015 |

OTHER PUBLICATIONS

Anritsu, "Anritsu Microwave K Connector", Nov. 1, 2012, XP055382635, URL:https://dl.cdn-anritsu.com/en-us/test-measurement/files/Manuals/Instruction-Sheet/10100-00046B.pdf.

Tanaka, "Bonding Wire Product Guide 2015-A", Jan. 1, 2015, pp. 1-32, XP055349378, URL:https://web.archive.org/web/20150316232604/http:www.topline.tv/Bonding_Wire_Catalog.pdf.

Machine translation of JP2000357755A.

* cited by examiner

CONNECTOR FOR CONNECTING AN OPTICAL FIBER AND AN ELECTRICAL CONDUCTOR

FIELD OF THE INVENTION

The present invention relates to connectors, in particular for connecting an optical fiber and an electrical conductor.

TECHNICAL BACKGROUND

EP 1376751 A1 discloses a connecting structure comprising a printed circuit board, at least one electrical contact, at least one coaxial electrical conductor, wherein the coaxial electrical conductor can be connected, at a first end, to the electrical contact.

WO 2015/0594 A1 discloses a printed circuit board, at least one coaxial electrical conductor which has at least one internal conductor, one external conductor and also one dielectric, wherein the coaxial electrical conductor can be connected, at a second end, directly to an electrical component which is arranged on the printed circuit board.

US 2016/0218455 A1 discloses a QSFP (Quad Small Form-factor Pluggable) plug for connecting an optical fiber to an electrical coaxial line. According to the said document, an optical signal is converted into an electrical signal by a QSFP plug. The document describes transmitting the converted electrical signal via shielded cables, preferably differentially by means of contact pairs on a twinaxial cable. In this case, the twinaxial cable is connected to a substrate in the vicinity of an electrical component by means of a plug. The signal is routed further to the electrical component by conductor tracks in or on the substrate.

SUMMARY OF THE INVENTION

Against this background, the object of the present invention is to specify an improved connector which is suitable for transmitting frequency signals at a relatively high data rate and a bandwidth of up to 100 GHz.

Inter alia, the present disclosure teaches a connector, in particular for connecting an optical fiber and an electrical conductor, comprising: a printed circuit board; at least one electrical contact which in each case has at least one internal conductor contact and one external conductor contact; at least one coaxial electrical conductor which has at least one internal conductor, one external conductor and also one dielectric; wherein the electrical conductor can be connected, at a first end, to the electrical contact, and wherein the electrical conductor can be connected, at a second end, directly to an electrical component which is arranged on the printed circuit board.

The idea on which the present invention is based involves designing the connection from a component on a printed circuit board to contacts to be continuously coaxial. The signal integrity, in particular the electromagnetic compatibility, is considerably improved with continuous coaxial signal transmission. To date, it has been found that transmission faults, which can be attributed to poor signal integrity, arise particularly in the region of non-coaxial contacts or lines.

In known solutions, there is often a region with non-coaxial lines between a coaxial line and an electrical component since the coaxial line is connected to a non-coaxial conductor track, which is connected to an electronic component, on a printed circuit board.

It goes without saying that the features cited above and those still to be explained below can be used not only in the respectively specified combination but also in other combinations or on their own, without departing from the scope of the present invention.

According to a preferred embodiment of the invention, the diameter of the electrical conductor is at most 100 µm, in particular at most 85 µm, further particularly at most 75 µm. The said diameters enable impedance-controlled transmission of the signal from the electrical conductor to an electrical component on the printed circuit board by the said diameter matching the contact area of an electrical component on the printed circuit board.

According to a preferred embodiment, the contact is of non-planar design. Non-planar coaxial contacts exhibit shielding of the internal conductor contact by the external conductor contact. The data rate and also the bandwidth can be further increased in this way.

Planar contacts are, for example, GSG (Ground-Signal-Ground) flat contacts. In GSG flat contacts, a flat contact element "ground" is connected to earth or the external conductor of an electrical conductor, but the flat contact element "ground" does not form a shield for the flat contact element "signal" which is connected to the internal conductor.

According to a preferred embodiment, the conductor is bonded, at the second end, onto an electronic component. A defect between the conductor and the component is kept as low as possible in this way.

According to a preferred embodiment of the invention, in each case one electrical conductor is connected to the electrical contact by means of a plurality of electrically conductive connecting areas. This ensures a particularly high signal integrity in a connection between the electrical conductor and the electrical contact.

In this case, it is particularly expedient for contact to be made with the internal conductor of the electrical conductor by the internal conductor contact by means of a first connecting area, and also for contact to be made with the external conductor by the external conductor contact by means of at least one second connecting area. This ensures continuous shielding of the line and the contact. In this case, the first and the second connecting area can be soldered, for example, to the electrical conductor and the contacts.

In a connector with a plurality of contacts, it is particularly advantageous when the second connecting area makes contact with a plurality of external conductor contacts, for example the second connecting area can be designed as a strip which makes contact with all of the external conductor contacts. The production of a connector according to an embodiment of the invention can be simplified in this way.

It is further particularly advantageous to insulate the first connecting area, which forms an internal conductor connection, and the second connecting area, which forms an external conductor connection, from one another by a dielectric. By way of example, the dielectric can be designed as a plastic layer between the first connecting area and the second connecting area. As an alternative, it is feasible for a uniform connecting area to first be applied, said connecting area being separated by a laser trench in a subsequent method step. It goes without saying that air is a suitable dielectric too.

It is particularly advantageous when the first connecting area, the dielectric and the second connecting area are arranged one above the other. This layer sequence can be produced, for example, by a dielectric plastic being vapordeposited on the first connecting area and a further metallization being applied to the plastic layer.

As an alternative, the second connecting area can be formed next to the first connecting area, for example by the connecting areas being separated by trenches.

It goes without saying that the second connecting area can be formed both next to and also above the first connecting area, for example by a metallization on a dielectric being connected to a conductive layer situated therebeneath by means of a through-contact, so that a coherent second connecting area is produced.

According to a further embodiment of the invention, the internal conductor is bonded directly onto the internal conductor contact. A particularly simple connection of the internal conductor contact to the internal conductor of the electrical conductor can be provided in this way. Furthermore, a possible defect between the internal conductor and the internal conductor contact extends over a small region.

According to a further preferred embodiment of the invention, the connector has contacts which are stacked one above the other. Stacking the contacts in a plurality of levels produces a difference in line length between the upper and the lower contacts. It is therefore necessary to provide means for compensating for a time delay of the signal between the upper and the lower contacts. A means of this kind for compensating for the time delay is, for example, the variation in the dielectric between the internal conductor contact and the external conductor contact of the lower contacts. The structure of a connector according to an embodiment of the invention can be designed to be particularly compact in this way.

According to a further preferred embodiment of the invention, the printed circuit board has at least one transducer for converting an optical signal into an electrical signal. Therefore, a signal which is converted from an optical signal into an electrical signal can be particularly advantageously transmitted to the contacts of a connector according to an embodiment of the invention. Furthermore, the printed circuit board can have transducers for converting electrical signals into optical signals.

In this case, it is particularly advantageous when the optical signal, after it is converted into an electrical signal, is always transmitted by means of a coaxial connection. Furthermore, an electrical signal which is intended to be transmitted to an optical fiber, before it is converted into an optical signal, is continuously transmitted by means of a coaxial connection.

One field of application for the technology according to an embodiment of the invention is in electrooptical transceivers comprising a connector according to one of the preceding embodiments.

The above refinements and developments can, where appropriate, be combined with one another in any desired manner. Further possible refinements, developments and implementations of the invention also comprise not explicitly cited combinations of features of the invention that are described above or below in respect of the exemplary embodiments. In particular, a person skilled in the art will also add individual aspects in this case as improvements or additions to the respective basic form of the present invention.

CONTENTS OF THE DRAWING

The present invention will be explained in greater detail below using the exemplary embodiments which are shown in the diagrammatic figures of the drawing, in which.

The accompanying figures of the drawing are intended to provide a further understanding of the embodiments of the invention. They illustrate embodiments and, in conjunction with the description, serve to explain principles and concepts of the invention. Other embodiments and many of the advantages mentioned become apparent in view of the drawings. The elements shown in the drawings are not necessarily shown true to scale in relation to one another.

In the figures of the drawing, identical, functionally identical and identically acting elements, features and components are respectively provided with the same reference symbols—unless stated otherwise.

The figures are described below in an interrelated and comprehensive manner.

DESCRIPTION OF EXEMPLARY EMBODIMENTS

Figure 1:
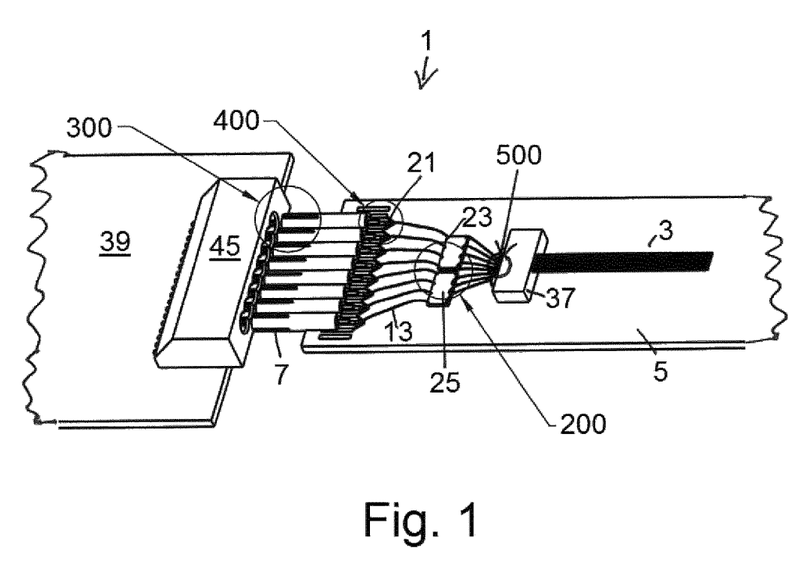
FIG. 1 shows a schematic view of a connector according to an embodiment of the invention.

FIG. 1 shows a perspective view of a connection comprising a connector 1 according to an embodiment of the invention. The connector 1 connects one or more optical fibers 3 to coaxial electrical conductors 13, 7, 41.

To this end, the connector 1 has a transducer 37 which converts an optical signal into an electrical signal and also an electrical signal into an optical signal. The transducer can have one or more elements for optical beam guidance, such as prisms, and also a laser or photodiodes. The transducer 37 is connected to two electrical components 25 by means of eight coaxial electrical conductors 13.

Figure 5:
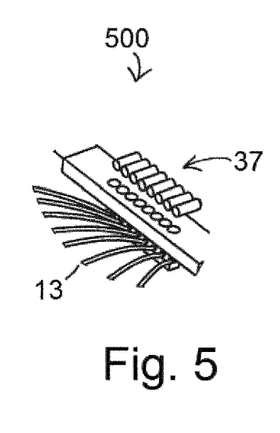
FIG. 5 shows a view of a detail according to FIG. 1.

A view of a detail 500 of the connection region of the coaxial conductor 13 to the transducer 37 is illustrated in FIG. 5.

The first electronic component 25, which is connected to the transducer 37 by means of four coaxial conductors 13, is in the form of a transmitter or driver. In this embodiment, said driver is a VCSEL (vertical cavity surface emitting laser) driver. The second electronic component 25, which is connected to the transducer 37 by means of four further coaxial conductors 13, is in the form of an amplifier, a so-called TIA (transimpedance amplifier).

Figure 2:
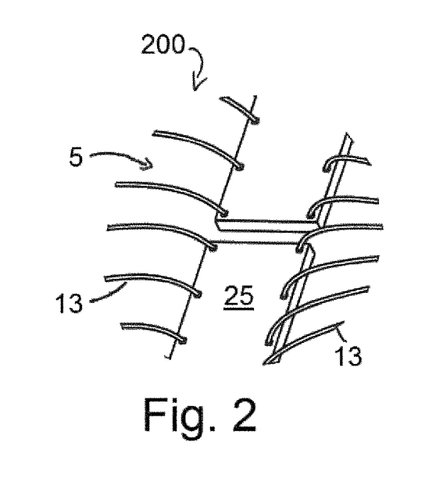
FIG. 2 shows a view of a detail according to FIG. 1.

A further view of a detail 200 in respect of the connection region of the coaxial conductors 13 to the electrical components 25 is illustrated in FIG. 2.

The amplifier is designed to amplify an electrical signal.

The electronic components 25 are connected to the electrical contacts 7 of the connector 1 by means of eight coaxial conductors 13. The coaxial conductors 13 are connected to the eight contacts 7 by means of a connecting region in each case.

Figure 4:
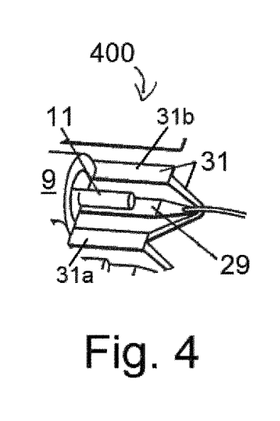
FIG. 4 shows a view of a detail according to FIG. 1.

The connecting region is illustrated in a view of a detail 400 in FIG. 4.

The contacts 7 are in the form of coaxial contacts. They each have an internal conductor contact 11 and also an external conductor contact 9.

It is also equally conceivable to use one integral external conductor contact, instead of a plurality of separate external conductor contacts 9, for the internal conductor contact 11.

The contacts 7 form a male plug which is designed to be connected to a female connector 45. The connector 45 is mounted on a second printed circuit board 39.

Figure 3:
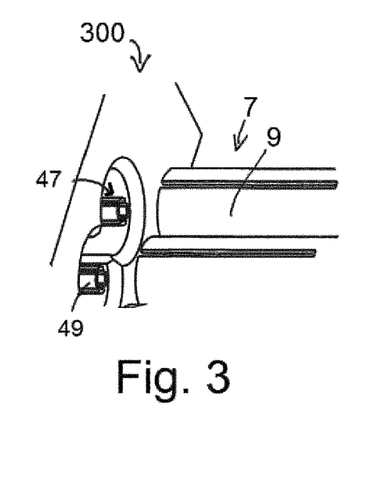
FIG. 3 shows a view of a detail according to FIG. 1.

A view of a detail 300 with the male contacts 7 and the female connector 45 is illustrated in FIG. 3.

The coaxial conductors 13 have approximately a diameter of 70 μm. These extremely thin coaxial conductors 13 allow a continuous connection between the transducer 37, by means of amplifier or driver, to the contacts 7. It has been found that coaxial lines of conventional diameters are not suitable for connection to electronic components on a printed circuit board since their diameter is often too large to be able to be directly connected to the electronic components. Therefore, known solutions rely on electrical conductor tracks on a printed circuit board in order to establish a connection to an electrical component, or bond customary bonding wires onto electronic components.

FIG. 2 shows the view of a detail 200 which illustrates the connection of the coaxial conductors 13 to the electronic components 25 in a perspective manner. FIG. 2 shows that the coaxial conductors 13 are connected directly to the electronic components 25. This is possible on account of the small diameter of approximately 70 μm of the electrical conductors 13, in particular since it is often necessary to connect a plurality of coaxial conductors 13 to one electronic component, for which reason stringent requirements are made in respect of the compactness of the coaxial conductors 13.

FIG. 3 shows the view of a detail 300 according to FIG. 1, which view illustrates the coaxial contacts 47 together with the internal conductor contacts 49 of the female connector 45.

FIG. 4 shows the view of a detail 400 according to FIG. 1, which view shows a connection region of the electrical conductor 13 and the coaxial contacts 7. FIG. 4 shows that the electrical conductor 13 is connected to the coaxial contacts 7 by means of a plurality of connecting areas 29, 31 which are in the form of metallic strips here. A first connecting area 29 connects the internal conductor contact 11 of a contact 7 to the internal conductor 15 of the electrical conductor 13.

A second connecting area 31, which has 2 connected metallic strips 31a, 31b, connects the external conductor contact 9 of the contact 7 to the external conductor 17 of the electrical conductor 13. This ensures an impedance-controlled transition between the electrical conductor 13 and the contacts 7. It is apparent that the metallic strip 31a makes contact with two external conductor contacts 9, whereas the metallic strip 31b makes contact with only one external conductor contact 9.

As an alternative, the second connecting area 31 can also be in the form of a continuous metallic area, wherein a first connecting area 29 is cut out of the metallic area and therefore is separated from the metallic area. As an alternative, a dielectric plastic layer can also be formed between two connecting areas 29 and 31 which are situated one above the other.

FIG. 5 shows the view of a detail 500 according to FIG. 1. 500 shows the direct connection of the electrical conductors 13 to the transducer 37 which converts an optical signal into an electrical signal or an electrical signal into an optical signal.

Figure 6:
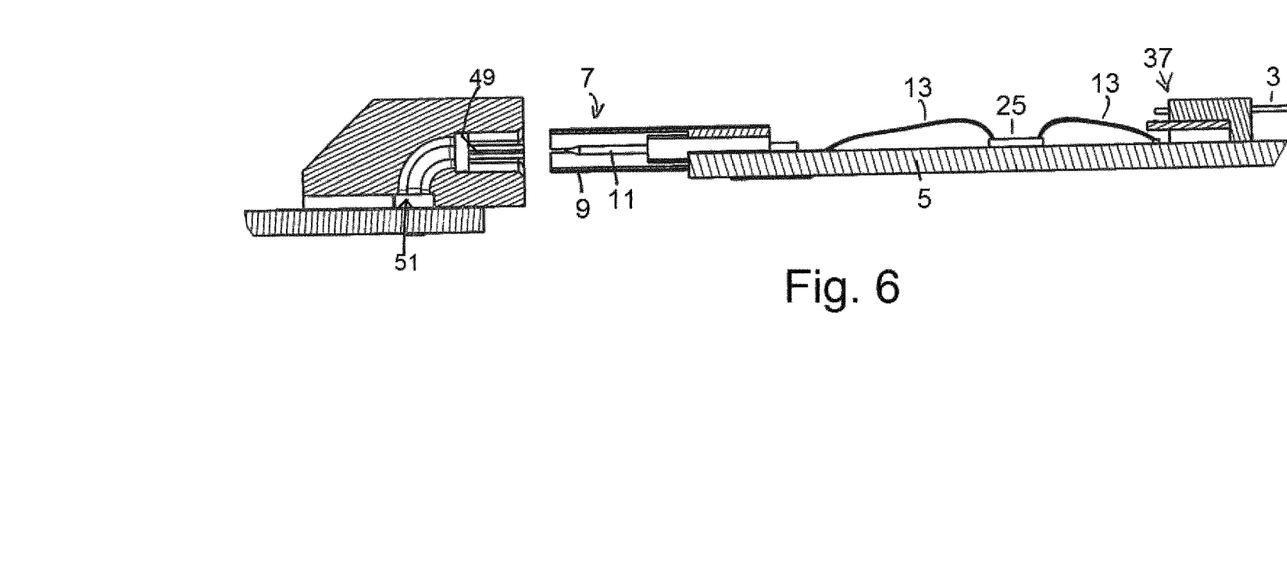
FIG. 6 shows a schematic sectional view of a connection according to an embodiment of the invention.

FIG. 6 schematically shows a sectional view of a connection according to FIG. 1. FIG. 6 shows that the electrical conductors 13 are not formed flat on the printed circuit board 5 but rather extend spatially over the printed circuit board 5 and an intermediate space is formed between the electrical conductor 13 and the printed circuit board 5. Additional installation space for mounting the conductors 13 can be saved in this way. Since the signals are routed by means of the conductors 13 independently of the substrate, reduced technical requirements are placed on the substrate in respect of material and number of signal layers. In particular, a plurality of conductors 13 can intersect.

In FIG. 6, the connector 1 is in the form of a straight plug and the corresponding female connector 45 is in the form of an angled plug. It goes without saying that, as an alternative, the connector 1 can be in the form of an angled plug and the connector 45 can be in the form of a straight plug. The coaxial contacts 47 of the female connector 45 are connected to a further coaxial line 51.

Figure 7:
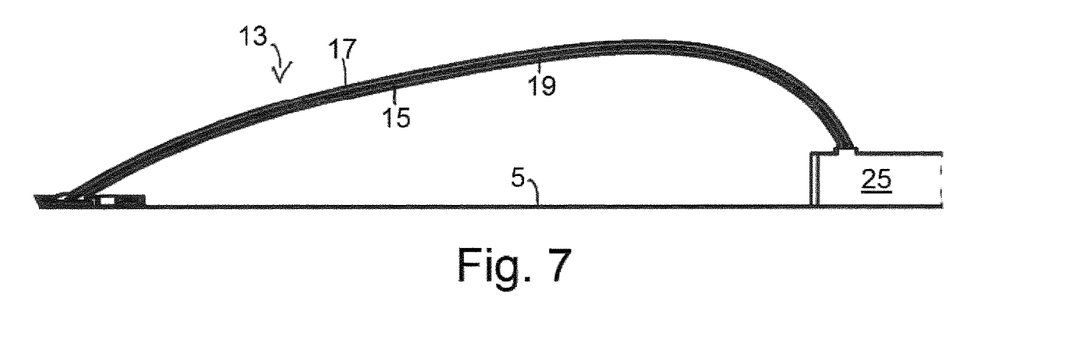
FIG. 7 shows a view of a detail of a connector according to an embodiment of the invention.

FIG. 7 shows a view of a detail of a cross section of a coaxial electrical conductor 13 which connects an electronic component 25 to electrical contacts 7. The conductor 13 is connected to the contacts 7 by means of first and second connecting areas 29 and 31 according to FIG. 8. The electrical component 25 is mounted on the printed circuit board. FIG. 7 shows that the electrical conductor 13 has an external conductor 17, a dielectric 19 which is illustrated as a bright line in FIG. 7, and an internal conductor 15.

Figure 8:
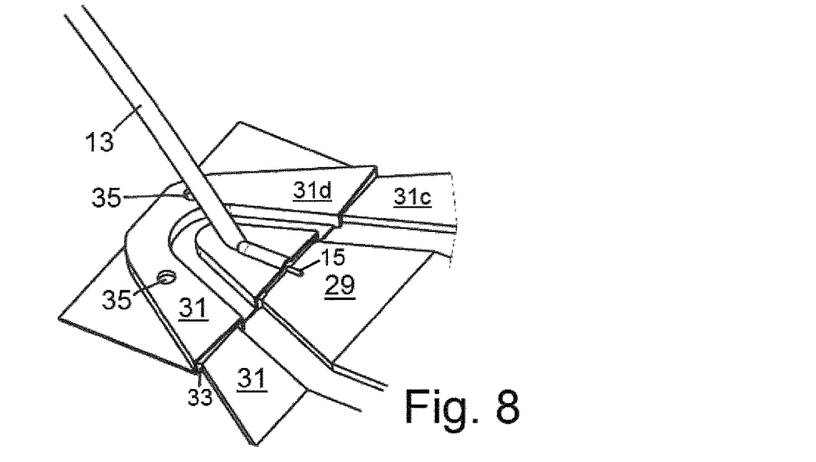
FIG. 8 shows a view of a detail of a connector according to an embodiment of the invention.

FIG. 8 shows a perspective view of a connecting region between an electrical conductor 13 and electrical contacts 7.

Figure 9:
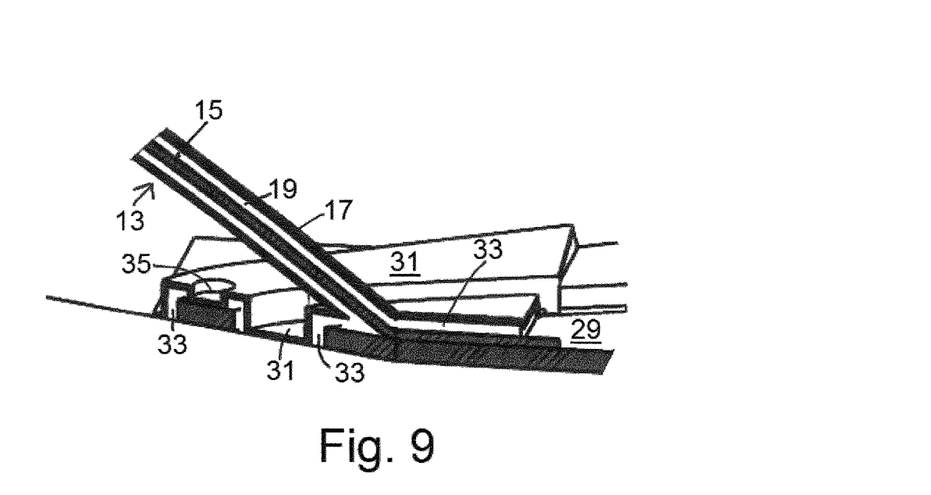
FIG. 9 shows a view of a detail of a connector according to an embodiment of the invention.

FIG. 9 shows a sectional view of the view according to FIG. 8.

The internal conductor 15 of the electrical conductor 13 makes contact with a first connecting area 29 which makes contact with the internal conductor contact 11 of a contact 7.

The internal conductor 15, the first connecting area 29 and also the metallic strip 31c, which is arranged next to the first connecting area 29, of the second connecting area 31 are covered by a dielectric plastic layer 33 which is applied onto the said parts. In the present embodiment, the plastic layer 33 corresponds to the dielectric 19 by the plastic layer 33 having been applied in the same process step as the dielectric. The metallization 31d, which is electrically connected to the external conductor 17 of the electrical conductor 13, is formed on the dielectric plastic layer 33. The metallization 31d is therefore insulated from the internal conductor 15 and the first connecting area 29 by the dielectric plastic layer 33. The metallization 31d is connected to the metallic strip 31c, which is formed next to the first connecting area 29 and makes contact with an external conductor contact 9, by means of a plurality of through-contacts 35. Therefore, the metallic strips 31c, the metallization 31d and the through-contact 35 form a coherent second connecting area 31. The metallic strip 31c is spatially separated and insulated from the first connecting area 29.

Figure 10:
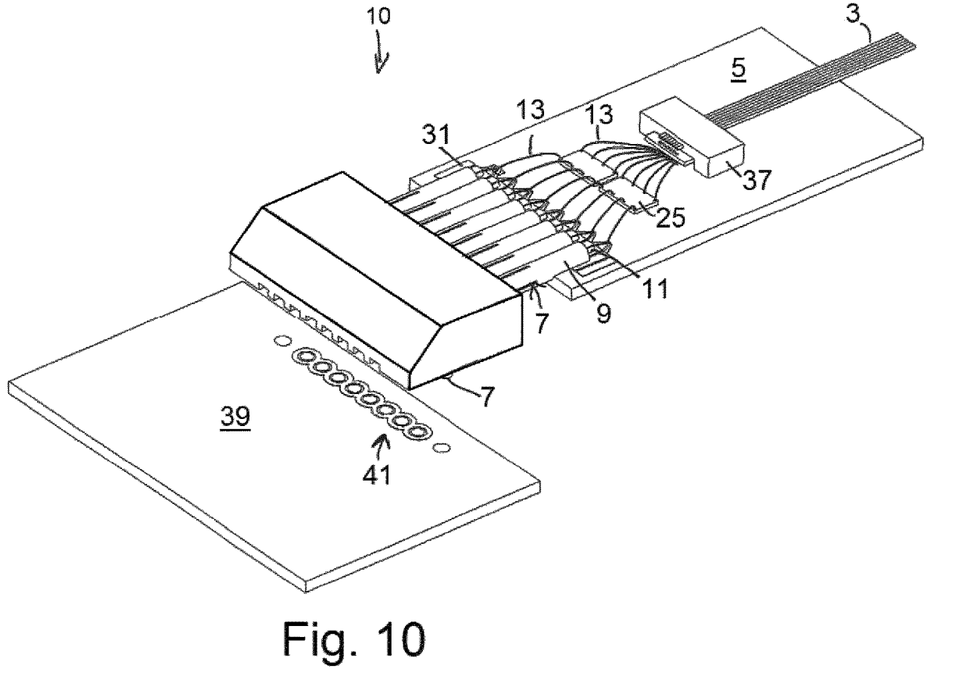
FIG. 10 shows a schematic view of a connection according to an embodiment of the invention.

FIG. 10 shows a connector 10 which is similar to the connector 1. The connector 10 differs from the connector 1 in that it is in the form of an angled connector. Accordingly, contact can be made with the connector 10 by coaxial straight contacts 41 on a further printed circuit board 39. The contacts 41 are connected to coaxial lines (not illustrated) which run in the printed circuit board 39.

Although the present invention has been fully described above with reference to preferred exemplary embodiments, it is not limited thereto but rather can be modified in a variety of ways.

LIST OF REFERENCE SYMBOLS

1 Connector
3 Optical fiber
5 Printed circuit board
7 Contact
9 Internal conductor contact
10 Connector
11 External conductor contact
13 Electrical conductor
15 Internal conductor
17 External conductor
19 Dielectric
21 First end
23 Second end
25 Electrical component
29 First connecting area
31 Second connecting area
31a Metallic strip
31b Metallic strip
31c Metallic strip
31d Metallization
33 Dielectric
35 Plated through-hole
37 Transducer
39 Printed circuit board
41 Coaxial contacts
45 Connector
47 Contacts
49 Internal conductor contact
51 Coaxial line
200 View of a detail
300 View of a detail
400 View of a detail
500 View of a detail

The invention claimed is:

1. A connector, comprising:
a plug-type connector comprising an inner connector conductor and an outer connector conductor substantially coaxial to said inner connector conductor;
a signal line comprising an inner conductor, a dielectric layer and an outer conductor, said dielectric layer insulating said inner conductor from said outer conductor;
a substrate;
a substantially planar contact that electrically connects said inner connector conductor and said inner conductor; and
a conductive layer, wherein
said substantially planar contact is formed on a major surface of said substrate,
said outer conductor is substantially coaxial to a first portion of said inner conductor,
said substantially planar contact comprises a first contact conductor and a second contact conductor,
a terminal portion of said inner conductor directly contacts said second contact conductor,
a first distance from said first contact conductor to said second contact conductor proximate to said inner conductor is substantially smaller than a second distance from said first contact conductor to said second contact conductor proximate to said inner connector conductor,
said first contact conductor is electrically connected to said outer conductor via said conductive layer, and
said conductive layer substantially follows a contour of said substantially planar contact and contacts said substrate at a location intermediate said first contact conductor and said second contact conductor.

2. The connector of claim 1, wherein:
a diameter of said signal line is less than 100 μm.

3. The connector of claim 1, wherein:
a first side of a substantially planar portion of said dielectric layer directly contacts said terminal portion of said inner conductor, and
a second side of said substantially planar portion of said dielectric layer opposite said terminal portion directly contacts a substantially planar portion of said conductive layer.

4. The connector of claim 1, wherein:
said outer conductor is electrically connected to said outer connector conductor via said conductive layer and said first contact conductor.

5. The connector of claim 1, wherein:
said outer conductor is electrically connected to said outer connector conductor.

6. The connector of claim 1, wherein:
said first contact conductor comprises a generally V-shaped interior edge, and
said second contact conductor comprises a tip that extends into a generally V-shaped region defined by said generally V-shaped interior edge.

7. The connector of claim 1, wherein:
a portion of said plug-type connector that receives a counterpart plug connector is rigidly affixed to said substantially planar contact.

8. The connector of claim 1, wherein:
said conductive layer shields said first contact conductor from said second contact conductor in a vicinity of said terminal portion.

9. A connector, comprising:
a substantially planar substrate;
an opto-electrical converter attachable to an optical fiber to receive an optical signal;
an electronic circuit;
a plurality of plug-type connectors, each plug-type connector comprising an inner connector conductor and an outer connector conductor substantially coaxial to said inner connector conductor;
a first plurality of signal lines, each signal line comprising an inner conductor, a dielectric layer and an outer conductor in substantially coaxial arrangement, said dielectric layer insulating said inner conductor from said outer conductor;
a second plurality of signal lines, each signal line comprising an inner conductor, a dielectric layer and an outer conductor in substantially coaxial arrangement, said dielectric layer insulating said inner conductor from said outer conductor;
a first substantially planar contact that electrically connects the respective inner connector conductor of one of said plurality of plug-type connectors and the respective inner conductor of one of said second plurality of signal lines; and
a second substantially planar contact that electrically connects the respective outer connector conductor of one of said plurality of plug-type connectors and the respective outer conductor of one of said second plurality of signal lines, wherein said electronic circuit is electrically connected to said opto-electrical converter via said first plurality of signal lines, said electronic circuit is electrically connected to said plurality of plug-type connectors via said second plurality of signal lines, said opto-electrical converter, said electronic circuit and said plurality of plug-type connectors are fastened to said substrate, said plug-type connectors constituting said plurality of plug-type connectors rigidly extend from said substrate in parallel, said second substantially planar contact comprises a generally V-shaped interior edge, said first substantially planar contact comprises a tip that extends into a generally V-shaped region defined by said generally V-shaped interior edge, and said respective outer conductor contacts said substantially planar substrate intermediate said tip and said generally V-shaped interior edge.

10. The connector of claim 9, wherein:
a diameter of each signal line of said first plurality of signal lines and said second plurality of signal lines is less than 100 µm.

11. The connector of claim 9, comprising:
a substantially planar contact that electrically connects the respective inner connector conductor of one of said plurality of plug-type connectors and the respective inner conductor of one of said second plurality of signal lines, wherein a terminal portion of said respective inner conductor directly contacts said substantially planar contact.

12. The connector of claim 11, wherein:
a substantially planar terminal portion of the respective outer conductor of said second plurality of signal lines is parallel to said substantially planar contact.

13. The connector of claim 12, wherein:
a first side of a substantially planar portion of the respective dielectric layer of said second plurality of signal lines directly contacts said terminal portion of said respective inner conductor, and a second side of said substantially planar portion of said respective dielectric layer directly contacts said substantially planar terminal portion of said respective outer conductor.

14. The connector of claim 9, wherein:
said opto-electrical converter is attachable to said optical fiber such that said opto-electrical converter secures an end portion of said optical fiber.

* * * * *